(12) United States Patent
Murakami

(10) Patent No.: US 12,031,740 B2
(45) Date of Patent: Jul. 9, 2024

(54) FACILITY DEVICE MANAGEMENT SYSTEM

(71) Applicant: DAIKIN INDUSTRIES, LTD., Osaka (JP)

(72) Inventor: Yuki Murakami, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 133 days.

(21) Appl. No.: 17/687,197

(22) Filed: Mar. 4, 2022

(65) Prior Publication Data

US 2022/0186967 A1 Jun. 16, 2022

Related U.S. Application Data

(63) Continuation of application No. PCT/JP2020/033280, filed on Sep. 2, 2020.

(30) Foreign Application Priority Data

Sep. 9, 2019 (JP) .................................. 2019-164029
Jun. 10, 2020 (JP) .................................. 2020-100964

(51) Int. Cl.
*F24F 11/63* (2018.01)
*G05B 15/02* (2006.01)
(Continued)

(52) U.S. Cl.
CPC .............. *F24F 11/63* (2018.01); *G05B 15/02* (2013.01); *H04W 4/33* (2018.02); *H04W 4/38* (2018.02)

(58) Field of Classification Search
CPC ........ F24F 11/63; F24F 11/56; F24F 2110/10; F24F 2110/70; F24F 11/54; F24F 11/89;
(Continued)

(56) References Cited

U.S. PATENT DOCUMENTS

2013/0168038 A1 7/2013 Ishizaka
2014/0292535 A1 10/2014 Petite et al.
(Continued)

FOREIGN PATENT DOCUMENTS

JP 2009-186062 A 8/2009
JP 2010-3292 A 1/2010
(Continued)

OTHER PUBLICATIONS

International Preliminary Report of corresponding PCT Application No. PCT/JP2020/033280 dated Mar. 17, 2022.
(Continued)

*Primary Examiner* — Zhipeng Wang
(74) *Attorney, Agent, or Firm* — Global IP Counselors, LLP

(57) ABSTRACT

A facility device management system includes a plurality of facility devices including a first facility device having identification information, a management apparatus configured to communicate with the facility devices via a network, and a sensor device including a wireless communication unit. The management apparatus includes a storage unit. The first facility device includes a receiving unit configured to receive data from the sensor device via wireless communication, and a transmitting unit configured to transmit the data, together with the identification information, to the management apparatus. The management apparatus associates the first facility device and the sensor device with each other based on information received from the first facility device, and stores an association between the first facility device and the data of the sensor device in the storage unit.

18 Claims, 4 Drawing Sheets

(51) Int. Cl.
    *H04W 4/33*     (2018.01)
    *H04W 4/38*     (2018.01)

(58) Field of Classification Search
    CPC ...... H04W 4/33; H04W 4/38; H04L 12/2823; H04Q 2209/40
    See application file for complete search history.

(56) References Cited

U.S. PATENT DOCUMENTS

| | | | |
|---|---|---|---|
| 2016/0011753 A1* | 1/2016 | McFarland | G06F 3/0482 |
| | | | 715/771 |
| 2016/0360594 A1* | 12/2016 | Chemel | H05B 47/105 |
| 2017/0010998 A1 | 1/2017 | Hashimoto et al. | |
| 2018/0159756 A1* | 6/2018 | Matthews | H04L 67/02 |
| 2018/0276980 A1* | 9/2018 | Yukizane | G08B 17/10 |
| 2019/0179814 A1* | 6/2019 | Amano | G06F 9/48 |

FOREIGN PATENT DOCUMENTS

| | | |
|---|---|---|
| JP | 2010-243090 A | 10/2010 |
| WO | 2012/053230 A1 | 4/2012 |
| WO | 2015118629 A1 | 8/2015 |

OTHER PUBLICATIONS

International Search Report of corresponding PCT Application No. PCT/JP2020/033280 dated Nov. 10, 2020.
European Search Report of corresponding EP Application No. 20 86 3727.2 dated Aug. 24, 2022.

* cited by examiner

| TYPE | DEVICE ID | INSTALLATION LOCATION |
|---|---|---|
| INDOOR UNIT | 10a | 3F WEST |
| | 10b | 3F EAST-SIDE CENTER |
| | 10c | 3F EAST |
| | ⋮ | ⋮ |
| VENTILATION DEVICE | 11a | 3F WEST |
| | 11b | 2F WEST |
| | 11c | 1F WEST |
| OUTSIDE AIR COOLING DEVICE | 12a | 3F WEST |
| | 12b | 2F WEST |
| | 12c | 1F WEST |
| OUTDOOR UNIT | 13 | EAST ON ROOF |
| TEMPERATURE SENSOR | 14a | 3F WEST |
| | 14b | 3F EAST-SIDE CENTER |
| | 14c | 3F EAST |
| | ⋮ | ⋮ |
| $CO_2$ SENSOR | 15a | 3F WEST |
| | 15b | 3F EAST |
| | 15c | 2F EAST-SIDE CENTER |
| | ⋮ | ⋮ |

FIG. 2

| CONTROL PURPOSE | CONTROL CORRESPONDENCE RELATIONSHIP |
|---|---|
| TEMPERATURE ADJUSTMENT | INDOOR UNIT × TEMPERATURE |
| $CO_2$ CONCENTRATION CONTROL | VENTILATION DEVICE × $CO_2$ |
| OUTSIDE AIR COOLING | OUTSIDE AIR COOLING DEVICE × TEMPERATURE |

FIG. 3

| PROGRAM NAME | INPUT | OUTPUT | ENABLING/ DISABLING |
|---|---|---|---|
| TEMPERATURE ADJUSTMENT PROGRAM 1 | DATA OF 14a TEMPERATURE SENSOR | INDOOR UNIT 10a | ENABLED |
| TEMPERATURE ADJUSTMENT PROGRAM 2 | DATA OF 14d TEMPERATURE SENSOR | INDOOR UNIT 10d | DISABLED |
| $CO_2$ CONCENTRATION CONTROL 3 | DATA 15e OF $CO_2$ SENSOR | VENTILATION DEVICE 11c | ENABLED |

FIG. 4

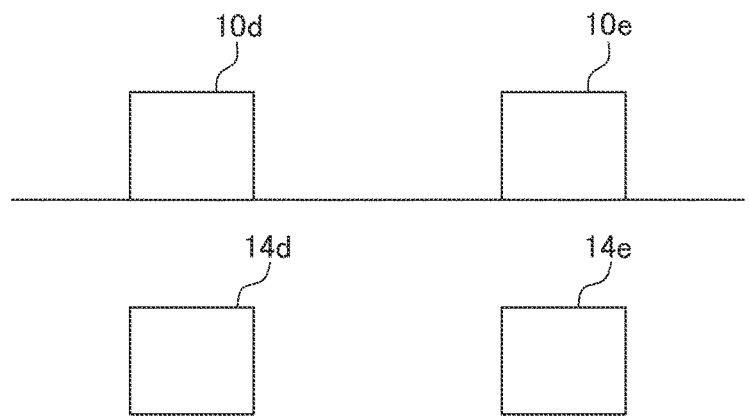

FIG. 5A

FACILITY DEVICE MANAGEMENT SYSTEM

CROSS-REFERENCE TO RELATED APPLICATIONS

This is a continuation of International Application No. PCT/JP2020/033280 filed on Sep. 2, 2020, which claims priority to Japanese Patent Application Nos. 2019-164029, filed on Sep. 9, 2019 and 2020-100964, filed on Jun. 10, 2020. The entire disclosures of these applications are incorporated by reference herein.

BACKGROUND

Field of Invention

The present disclosure relates to a facility device management system.

Background Information

In the related art, to manage a large number of facility devices and sensor devices installed in a building, respective installation locations of the facility devices and the sensor devices are manually input to a device management apparatus when the facility devices and the sensor devices are connected to the device management apparatus (see Japanese Unexamined Patent Application Publication No. 2010-3292).

SUMMARY

A facility device management system according to a first aspect includes a plurality of facility devices including a first facility device having identification information, a management apparatus configured to communicate with the facility devices via a network, and a sensor device including a wireless communication unit. The management apparatus includes a storage unit. The first facility device includes a receiving unit configured to receive data from the sensor device via wireless communication, and a transmitting unit configured to transmit the data, together with the identification information, to the management apparatus. The management apparatus associates the first facility device and the sensor device with each other based on information received from the first facility device, and stores an association between the first facility device and the data of the sensor device in the storage unit.

BRIEF DESCRIPTION OF THE DRAWINGS

FIG. 2 is a diagram illustrating information in a database of a storage unit, regarding device information and installation locations of facility devices and sensor devices.

FIG. 3 is a diagram illustrating type correspondence relationships and control purposes of facility devices and sensor devices.

FIG. 4 is a diagram illustrating cooperation control programs.

FIG. 5A is a diagram illustrating an example of the installation positions of indoor units and temperature sensors.

DETAILED DESCRIPTION OF EMBODIMENT(S)

First Embodiment (1) Overall Configuration

Figure 1:
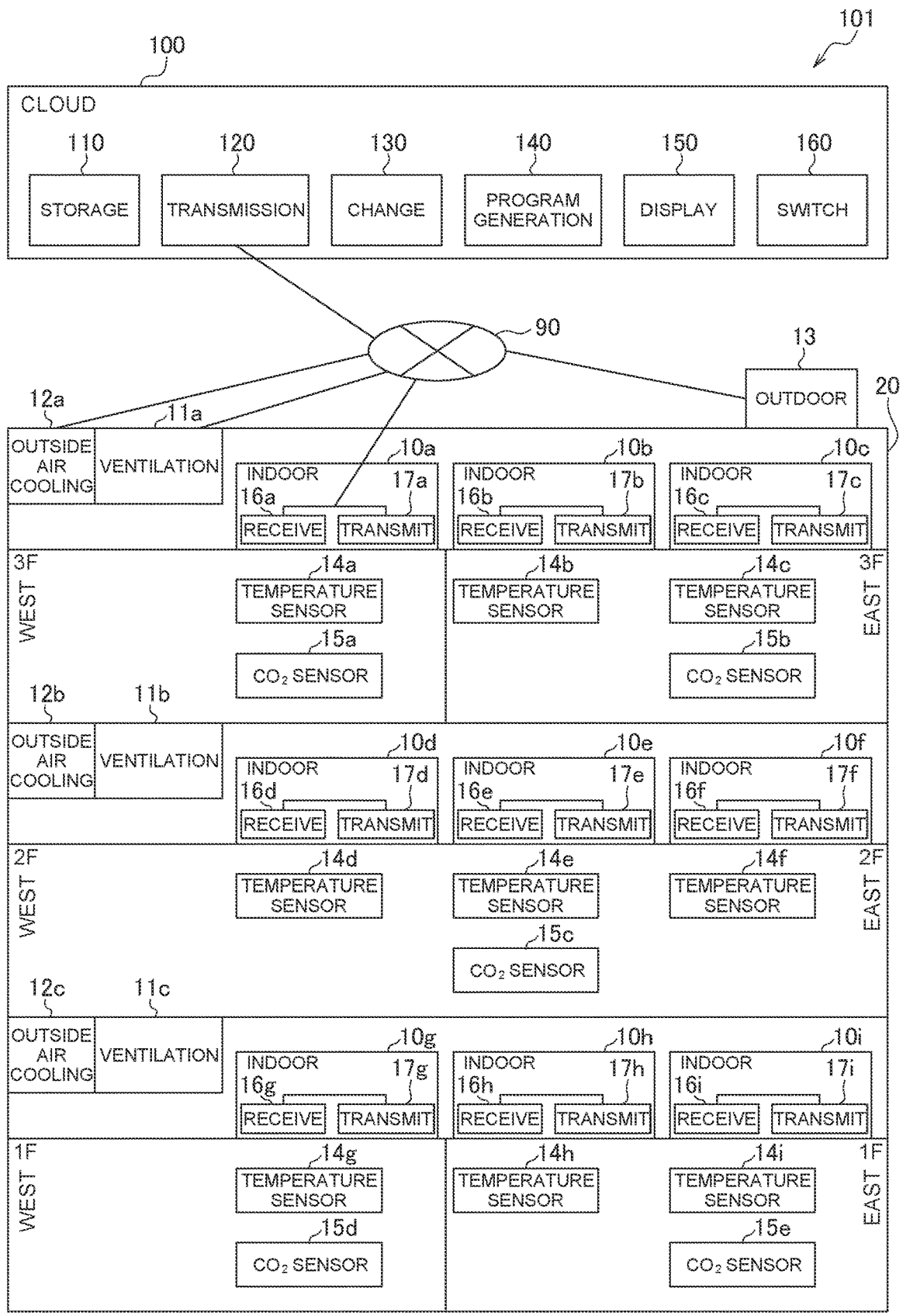
FIG. 1 is a functional block diagram of a facility device management system.

As illustrated in FIG. 1, a facility device management system 101 includes a plurality of facility devices, a management apparatus 100, and sensor devices. The plurality of facility devices refer to indoor units $10a$ to $10i$, ventilation devices $11a$ to $11c$, outside air cooling devices $12a$ to $12c$, an outdoor unit 13, and the like installed in a building 20. The management apparatus 100 communicates with the plurality of facility devices via a network 90. The sensor devices refer to temperature sensors $14a$ to $14i$, $CO_2$ sensors $15a$ to $15e$, and the like, each having a wireless communication unit. The indoor units $10a$ to $10i$ and the outdoor unit 13 constitute an air conditioner.

The management apparatus 100 remotely manages a plurality of facility devices and sensor devices. The management apparatus 100 includes a storage unit 110, a transmitting unit 120, a change unit 130, a program generation unit 140, a display unit 150, a switching unit 160, and a control calculation unit (not illustrated). The transmitting unit 120 is connected to the indoor units $10a$ to $10i$, the ventilation devices $11a$ to $11c$, the outside air cooling devices $12a$ to $12c$, and the outdoor unit 13 installed in the building 20 via a network.

The facility device management system 101 provides various services to the owner of the building 20 and the users of the plurality of facility devices and the sensor devices. For example, services such as cooperation control programs for the indoor units $10a$ to $10i$ and the temperature sensors $14a$ to $14i$ are provided. To provide such services, information on devices, such as identification information of facility devices and sensor devices, is necessary. The data of the temperature sensors $14a$ to $14i$ and the identification information of the indoor units $10a$ to $10i$ are transmitted from transmitting units $17a$ to $17i$ of the indoor units $10a$ to $10i$ to the management apparatus 100 via the network 90 and stored in the storage unit 110.

(2) Detailed Configuration (2-1) Target Devices

The devices to be managed include facility devices installed in the building 20, such as the indoor units $10a$ to $10i$, the ventilation devices $11a$ to $11c$, the outside air cooling devices $12a$ to $12c$, and the outdoor unit 13, and various sensors such as the temperature sensors $14a$ to $14i$ and the $CO_2$ sensors $15a$ to $15e$.

(2-1-1) Indoor Units

As illustrated in FIG. 1, the indoor units $10a$ to $10i$ include receiving units $16a$ to $16i$ and the transmitting units $17a$ to $17i$, respectively.

The indoor unit $10a$ is installed near the ceiling of the west area on the third floor of the building 20. The indoor unit $10b$ is installed near the ceiling of the east-side central area on the third floor of the building 20. The indoor unit $10c$ is installed near the ceiling of the east area on the third floor of the building 20.

In the indoor units $10a$ to $10c$, the receiving units $16a$ to $16c$ receive data from the temperature sensors $14a$ to $14c$, each including a wireless communication unit, via wireless communication, respectively. In the indoor units $10a$ to $10c$, the transmitting units $17a$ to $17c$ transmit the data of the temperature sensors $14a$ to $14c$, together with the identification information of the indoor units $10a$ to $10c$, to the management apparatus 100, respectively. The data of the temperature sensors 14a to 14c includes measurement values and sensor IDs of the temperature sensors 14a to 14c, respectively.

In the indoor units 10a and 10c, the receiving units 16a and 16c receive data from the $CO_2$ sensors 15a and 15b, each including a wireless communication unit, via wireless communication, respectively. In the indoor units 10a and 10c, the transmitting units 17a and 17c transmit the data of the $CO_2$ sensors 15a and 15b, together with the identification information of the indoor units 10a and 10c, to the management apparatus 100, respectively. The data of the $CO_2$ sensors 15a and 15b includes measurement values and sensor IDs of the $CO_2$ sensors 15a and 15b, respectively.

The indoor unit 10d is installed near the ceiling of the west area on the second floor of the building 20. The indoor unit 10e is installed near the ceiling of the east-side central area on the second floor of the building 20. The indoor unit 10f is installed near the ceiling of the east area on the second floor of the building 20.

In the indoor units 10d to 10f, the receiving units 16d to 16f receive data from the temperature sensors 14d to 14f, each including a wireless communication unit, via wireless communication, respectively. In the indoor units 10d to 10f, the transmitting units 17d to 17f transmit the data of the temperature sensors 14d to 14f, together with the identification information of the indoor units 10d to 10f, to the management apparatus 100, respectively. The data of the temperature sensors 14d to 14f includes measurement values and sensor IDs of the temperature sensors 14d to 14f, respectively.

In the indoor unit 10e, the receiving unit 16e receives data from the $CO_2$ sensor 15c including a wireless communication unit via wireless communication. In the indoor unit 10e, the transmitting unit 17e transmits the data of the $CO_2$ sensor 15c, together with the identification information of the indoor unit 10e, to the management apparatus 100. The data of the $CO_2$ sensor 15c includes a measurement value and a sensor ID of the $CO_2$ sensor 15c.

The indoor unit 10g is installed near the ceiling of the west area on the first floor of the building 20. The indoor unit 10h is installed near the ceiling of the east-side central area on the first floor of the building 20. The indoor unit 10i is installed near the ceiling of the east area on the first floor of the building 20.

In the indoor units 10g to 10i, the receiving units 16g to 16i receive data from the temperature sensors 14g to 14i, each including a wireless communication unit, via wireless communication, respectively. In the indoor units 10g to 10i, the transmitting units 17g to 17i transmit the data of the temperature sensors 14g to 14i, together with the identification information of the indoor units 10g to 10i, to the management apparatus 100, respectively. The data of the temperature sensors 14g to 14i includes measurement values and sensor IDs of the temperature sensors 14g to 14i, respectively.

In the indoor units 10g and 10i, the receiving units 16g and 16i receive data from the $CO_2$ sensors 15d and 15e, each including a wireless communication unit, via wireless communication, respectively. In the indoor units 10g and 10i, the transmitting units 17g and 17i transmit the data of the $CO_2$ sensors 15d and 15e, together with the identification information of the indoor units 10g and 10i, to the management apparatus 100, respectively. The data of the $CO_2$ sensors 15d and 15e includes measurement values and sensor IDs of the $CO_2$ sensors 15d and 15e, respectively.

The receiving units 16a to 16i and sensor devices each including a wireless communication unit perform communication via, for example, Bluetooth (registered trademark). Bluetooth (registered trademark) enables communication within a range of about m.

(2-1-2) Ventilation Devices

The ventilation device 11a is installed on the west side of the ceiling of the third floor of the building 20. The ventilation device 11b is installed on the west side of the ceiling of the second floor of the building 20. The ventilation device 11c is installed on the west side of the ceiling of the first floor of the building 20. The ventilation devices supply outdoor air into the building or exhaust indoor air to the outside of the building.

(2-1-3) Outside Air Cooling Devices

The outside air cooling device 12a is installed on the west side of the ceiling of the third floor of the building 20. The outside air cooling device 12b is installed on the west side of the ceiling of the second floor of the building 20. The outside air cooling device 12c is installed on the west side of the ceiling of the first floor of the building 20.

For example, when the measurement values in the data of the temperature sensors 14a to 14c on the third floor of the building 20 indicate that the outdoor air temperature is lower than the indoor temperature on the third floor of the building 20, the outside air cooling device 12a introduces outside air into the building to lower the indoor temperature on the third floor of the building 20.

(2-14) Outdoor Unit

The outdoor unit 13 is installed on the east side of the roof of the building 20. The outdoor unit 13 is connected to the indoor units 10a to 10i via refrigerant pipes. Further, the outdoor unit 13 communicates with the management apparatus 100 via the network 90.

(2-2) Management Apparatus

The management apparatus 100 is implemented by a computer. The management apparatus 100 includes the storage unit 110, the transmitting unit 120, the change unit 130, the program generation unit 140, the display unit 150, the switching unit 160, and a control calculation unit. The control calculation unit may be implemented as a processor such as a CPU or a GPU. The control calculation unit reads a program stored in the storage unit 110 and performs predetermined image processing or calculation processing in accordance with the program. The control calculation unit is further capable of writing a calculation result to the storage unit 110 or reading information stored in the storage unit 110 in accordance with the program. In the facility device management system 101 in FIG. 1, the management apparatus 100 has various functional blocks implemented by the control calculation unit. The storage unit 110 can be used as a database.

(2-2-1) Storage Unit

The storage unit 110 stores content in which the indoor units 10a to 10i and the temperature sensors 14a to 14i are associated with each other, on the basis of information received from the transmitting units 17a to 17i of the indoor units 10a to 10i. The association between the indoor units 10a to 10i and data of the temperature sensors 14a to 14i is stored in the storage unit 110. The storage unit 110 can be used as a database that stores type information, device IDs, and installation location information of facility devices and sensor devices.

In a case where a temperature/humidity sensor, instead of a temperature sensor, is associated with a predetermined indoor unit, the storage unit 110 stores an association between a plurality of pieces of data (temperature data and humidity data) of one temperature/humidity sensor and the indoor unit. At this time, the storage unit 110 also stores type information of the pieces of data in addition to the type information and the like of the sensor device.

(2-2-2) Transmitting Unit

The transmitting unit 120 transmits a predetermined control command to the indoor units 10a to 10i, the ventilation devices 11a to 11c, the outside air cooling devices 12a to 12c, and the outdoor unit 13.

For example, the transmitting unit 120 of the management apparatus 100 transmits a control command to the indoor unit 10a to decrease the room temperature on the west side on the third floor of the building 20. Further, the transmitting unit 120 of the management apparatus 100 transmits a control command to the ventilation device 11b to ventilate the air on the second floor of the building 20. Further, the transmitting unit 120 of the management apparatus 100 transmits a control command to the outside air cooling device 12c to introduce outside air into the building to decrease the room temperature on the first floor of the building 20.

(2-2-3) Display Unit

The display unit 150 displays a program for controlling the cooperation between the indoor units 10a to 10i and the temperature sensors 14a to 14i. Further, the display unit 150 displays a program for controlling the cooperation between the ventilation devices 11a to 11c and the $CO_2$ sensors 15a to 15e. Further, the display unit 150 displays a program for controlling the cooperation between the outside air cooling devices 12a to 12c and the temperature sensors 14a to 14i.

Further, the display unit 150 displays a cooperation control program selected in terms of at least one of a plurality of conditions. The plurality of conditions include conditions for control purposes such as temperature adjustment, $CO_2$ concentration control, and outside air cooling, installation locations of facility devices and sensor devices, types of facility devices, types of sensor devices, and enabling or disabling of cooperation control programs.

(3) Overall Operation

In a case where a facility device and a sensor device are installed in close proximity to each other in the building 20, the management apparatus 100 associates the facility device and the sensor device with each other on the basis of data received from the facility device. The storage unit 110 stores the association between the facility device and the data of the sensor device. The association is hereinafter referred to as the association A.

The association A is made between a facility device and a sensor device, and, based on the types of the facility device and the sensor device, an association is further made for controlling the cooperation between the facility device and the sensor device. For example, an association for controlling the cooperation between facility devices such as the indoor units 10a to 10i, the ventilation devices 11a to 11c, and the outside air cooling devices 12a to 12c and sensor devices such as the temperature sensors 14a to 14i and the $CO_2$ sensors 15a to 15e is hereinafter referred to as the association B.

As illustrated in FIG. 3, in a case where a control purpose is temperature adjustment, the association B is made between the indoor units 10a to 10i and the temperature sensors 14a to 14i. In a case where a control purpose is $CO_2$ concentration control, the association B is made between the ventilation devices 11a to 11c and the $CO_2$ sensors 15a to 15e. In a case where a control purpose is outside air cooling, the association B is made between the outside air cooling devices 12a to 12c and the temperature sensors 14a to 14i.

(3-1) Association B Between Indoor Unit and Temperature Sensor

The association B between the indoor units 10a to 10i, which are first facility devices, and the temperature sensors 14a to 14i will be described.

In the indoor units 10a to 10i, the receiving units 16a to 16i receive data from the temperature sensors 14a to 14i via wireless communication.

In the indoor units 10a to 10i, the transmitting units 17a to 17i transmit the data received from the temperature sensors 14a to 14i, together with the identification information of the indoor units 10a to 10i, to the management apparatus 100.

The management apparatus 100 stores the association A between the indoor units 10a to 10i and the temperature sensors 14a to 14i in the storage unit 110 on the basis of the information received from the transmitting units 17a to 17i of the indoor units 10a to 10i. Specifically, the association between the indoor units 10a to 10i and the data of the temperature sensors 14a to 14i is stored in the storage unit 110.

For example, in the indoor unit 10a installed near the ceiling on the west side on the third floor of the building 20, the receiving unit 16a receives the data of the temperature sensor 14a from the temperature sensor 14a installed in the room on the west side on the third floor of the building 20 via wireless communication. In the indoor unit 10a, the transmitting unit 17a transmits the data received from the temperature sensor 14a, together with the identification information of the indoor unit 10a, to the management apparatus 100. At this time, the storage unit 110 stores the association A between the indoor unit 10a and the temperature sensor 14a.

The association B between the indoor units 10a to 10i, which are first facility devices, and the temperature sensors 14a to 14i is made in response to the receiving units 16a to 16i in the indoor units 10a to 10i receiving the data of the temperature sensors 14a to 14i via wireless communication, without using the installation location information of the indoor units 10a to 10i and the temperature sensors 14a to 14i. Accordingly, the association A between the indoor units 10a to 10i, which are first facility devices, and the temperature sensors 14a to 14i is set as the association B between the indoor units 10a to 10i, which are first facility devices, and the temperature sensors 14a to 14i.

(3-2) Change of Association B Between Indoor Unit and Temperature Sensor

The facility device management system 101 can change the association B between the indoor units 10a to 10i, which are first facility devices, and the temperature sensors 14a to 14i.

The change unit 130 changes the association B between the indoor units 10a to 10i and the temperature sensors 14a to 14i in accordance with the degrees of influence on the measurement values of the temperature sensors 14a to 14i caused by the control commands from the transmitting unit 120.

For example, a case where the association B has been made between the indoor unit 10d and the temperature sensor 14d and the association B has been made between the indoor unit 10e and the temperature sensor 14e will be described as an example.

In FIG. 5A, as in FIG. 1, the indoor unit 10d and the temperature sensor 14d are installed in close proximity to each other. Also, the indoor unit 10e and the temperature sensor 14e are installed in close proximity to each other. In FIG. 5A, the association B is made between the indoor unit 10d and the temperature sensor 14d, and the association B is made between the indoor unit 10e and the temperature sensor 14e.

Figure 5B:
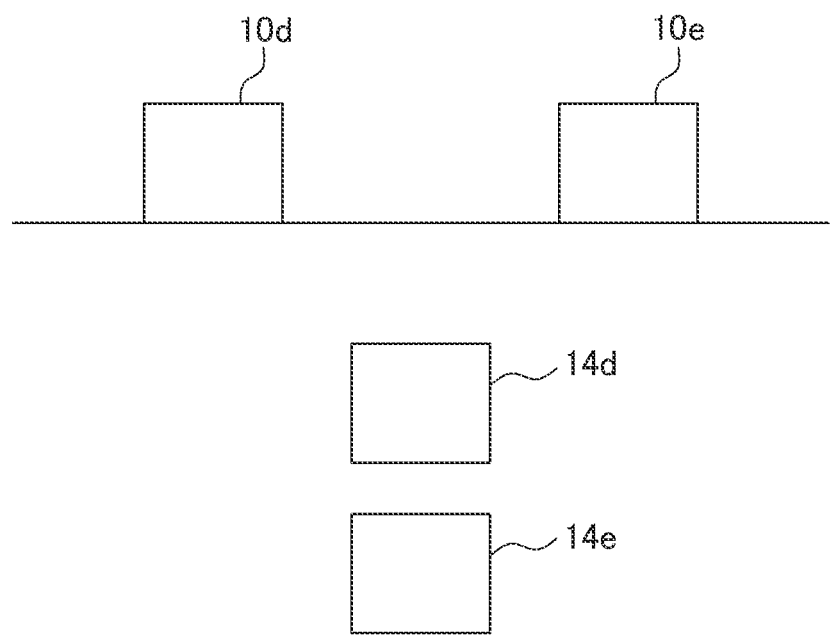
FIG. 5B is a diagram illustrating another example of the installation positions of the indoor units and the temperature sensors.

In FIG. 5B, the temperature sensor 14d is installed at a position such that the distance between the temperature sensor 14d and the indoor unit 10d is substantially equal to the distance between the temperature sensor 14d and the indoor unit 10e. Also, the temperature sensor 14e is installed at a position such that the distance between the temperature sensor 14e and the indoor unit 10d is substantially equal to the distance between the temperature sensor 14e and the indoor unit 10e.

The transmitting unit 120 transmits a control command to the indoor unit 10d to decrease the room temperature on the second floor of the building 20. At this time, in a case where the temperature sensor 14d and the temperature sensor 14e are installed in a manner as illustrated in FIG. 5B and the measurement value of the temperature sensor 14c decreases faster than that of the temperature sensor 14d, the association B between the indoor unit 10d and the temperature sensor 14d is changed to the association B between the indoor unit 10d and the temperature sensor 14e.

(3-3) Input of Installation Location Information

In the facility device management system 101 in this embodiment, the installation locations of the indoor units 10a to 10i are manually input by a facility device installation contractor (hereinafter referred to as the contractor) and stored in the storage unit 110.

When the contractor manually inputs the installation locations of the indoor units 10a to 10i, the storage unit 110 stores installation location information in which the association A is made between the temperature sensors 14a to 14i and the indoor units 10a to 10i, as the installation location information of the temperature sensors 14a to 14i.

(3-4) Association B Between Ventilation Device and $CO_2$ Sensor or Association B Between Outside Air Cooling Device and Temperature Sensor The association B between the ventilation devices 11a to 11c and the $CO_2$ sensors 15a to 15e or the association B between the outside air cooling devices 12a to 12c and the temperature sensors 14a to 14i will be described.

In the indoor units 10a to 10i, which are first facility devices, the transmitting units 17a to 17i transmit the data received from the temperature sensors 14a to 14i, together with the identification information of the indoor units 10a to 10i, to the management apparatus 100. In the indoor units 10a, 10c, 10e, 10g, and 10i, further, the transmitting units 17a, 17c, 17e, 17g, and 17i transmit the data received from the $CO_2$ sensors 15a to 15e, together with the identification information of the indoor units 10a, 10c, 10e, 10g, and 10i, to the management apparatus 100.

The storage unit 110 stores, as the installation location information of the temperature sensors 14a to 14i, the installation location information of the indoor units 10a to 10i for which the association A has been made with the temperature sensors 14a to 14i. The storage unit 110 further stores, as the installation location information of the $CO_2$ sensors 15a to 15e, the installation location information of the indoor units 10a, 10c, 10c, 10g, and 10i for which the association A has been made with the $CO_2$ sensors 15a to 15e.

In the facility device management system 101 in this embodiment, the installation locations of the ventilation devices 11a to 11c and the outside air cooling devices 12a to 12c are manually input by the contractor and stored in the storage unit 110.

FIG. 2 illustrates information in a database of the storage unit 110, such as types, device information such as device IDs, and installation locations of facility devices and sensor devices.

For example, the indoor units 10a, 10b, and 10c are installed near the ceiling of rooms in the west area on the third floor, the east-side central area on the third floor, and the east area on the third floor of the building 20, respectively.

The ventilation devices 11a to 11c are installed on the ceiling of the west area on the third floor, the west area on the second floor, and the west area on the first floor of the building 20, respectively.

The outside air cooling devices 12a to 12c are installed on the ceiling of the west area on the third floor, the west area on the second floor, and the west area on the first floor of the building 20, respectively.

The outdoor unit 13 is installed on the east side of the roof of the building 20.

For example, the temperature sensors 14a, 14b, and 14c are installed in rooms in the west area on the third floor, the east-side central area on the third floor, and the east area on the third floor of the building 20, respectively.

For example, the $CO_2$ sensors 15a and 15b are installed in the rooms in the west area on the third floor and the east area on the third floor of the building 20, respectively.

As described above, the storage unit 110 stores types of facility devices and installation location information thereof, types of sensor devices and installation location information thereof, and correspondence relationships between the types of the facility devices and the types of the sensor devices corresponding to control purposes such as temperature adjustment, $CO_2$ concentration control, and outside air cooling.

The types of facility devices refer to kinds of facility devices. An indoor unit is one type of facility device. A ventilation device is one type of facility device. An outside air cooling device is one type of facility device.

The types of sensor devices refer to kinds of sensor devices. A temperature sensor is one type of sensor device. A $CO_2$ sensor is one type of sensor device.

For example, the type of the indoor units 10a to 10i and the type of the temperature sensors 14a to 14i correspond to each other. The type of the ventilation devices 11a to 11c and the type of the $CO_2$ sensors 15a to 15e correspond to each other. The type of the outside air cooling devices 12a to 12c and the type of the temperature sensors 14a to 14i correspond to each other.

The facility device management system 101 determines, based on a type of sensor device and installation location information thereof and a type of facility device and installation location information thereof, the association B between the ventilation devices 11a to 11c and the $CO_2$ sensors 15a to 15e and the association B between the outside air cooling devices 12a to 12c and the temperature sensors 14a to 14i.

(3-5) Generation of Cooperation Control Program

The program generation unit 140 automatically generates a cooperation control program based on the association B between the indoor units 10a to 10i and the temperature sensors 14a to 14i. Further, the program generation unit 140 automatically generates a cooperation control program based on the association B between the ventilation devices 11a to 11c and the $CO_2$ sensors 15a to 15e. Further, the program generation unit 140 automatically generates a cooperation control program based on the association B between the outside air cooling devices 12a to 12c and the temperature sensors 14a to 14i.

The switching unit 160 switches between enabling and disabling each of the automatically generated association control programs. For example, the switching unit 160 can perform switching such that an unnecessary association control program is disabled among the automatically generated association control programs.

FIG. 4 is a diagram illustrating an example of cooperation control programs. For example, temperature adjustment program 1 has the data of the temperature sensor 14a as an input and the indoor unit 10a as an output. Temperature adjustment program 2 has the data of the temperature sensor 14d as an input and the indoor unit 10d as an output. $CO_2$ concentration control program 3 has the data of the $CO_2$ sensor 15e as an input and the ventilation device 11c as an output.

For example, in a case where the temperature adjustment program 2 is unnecessary among the automatically generated cooperation control programs, the contractor can perform switching using the switching unit 160 such that the temperature adjustment program 2 is disabled.

(4) Features
(4-1)

The facility device management system 101 according to this embodiment includes a plurality of facility devices, such as the indoor units 10a to 10i, the ventilation devices 11a to 11c, the outside air cooling devices 12a to 12c, and the outdoor unit 13, the management apparatus 100, and sensor devices, such as the temperature sensors 14a to 14i and the $CO_2$ sensors 15a to 15e. The plurality of facility devices include the indoor units 10a to 10i, each of which is a first facility device having identification information. The management apparatus 100 communicates with the indoor units 10a to 10i, the ventilation devices 11a to 11c, the outside air cooling devices 12a to 12c, and the outdoor unit 13 via the network 90. The temperature sensors 14a to 14i and the $CO_2$ sensors 15a to 15e each include a wireless communication unit. The indoor units 10a to 10i include the receiving units 16a to 16i that receive data from the temperature sensors 14a to 14i via wireless communication, and the transmitting units 17a to 17i that transmit data together with identification information to the management apparatus 100. The management apparatus 100 includes the storage unit 110. The management apparatus 100 associates the indoor units 10a to 10i and the temperature sensors 14a to 14i with each other based on the information received from the indoor units 10a to 10i. The management apparatus 100 stores the association between the indoor units 10a to 10i and the data of the temperature sensors 14a to 14i in the storage unit 110.

In this facility device management system, the indoor units 10a to 10i wirelessly acquire data from the temperature sensors 14a to 14i and transmit the data together with the identification information of the indoor units 10a to 10i to the management apparatus 100. Accordingly, the indoor units 10a to 10i and the temperature sensors 14a to 14i can be associated with each other.

In the related art, an operator manually inputs the installation locations of a plurality of indoor units and temperature sensors set in a building to a management apparatus and thus bears a large load. The facility device management system 101 eliminates the need for the operator to input these installation locations to the management apparatus and enables the indoor units and the temperature sensors to be associated with each other through wireless communication between the indoor units and the temperature sensors. As a result, the load on the operator can be reduced.

(4-2)

In the facility device management system 101 according to this embodiment, the data of the temperature sensors 14a to 14i includes measurement values. The management apparatus 100 further includes the transmitting unit 120 that transmits a predetermined control command to a facility device, and the change unit 130. The change unit 130 changes the association between the indoor units 10a to 10i and the temperature sensors 14a to 14i in accordance with the degree of influence on measurement values of sensor devices caused by control commands.

In this facility device management system, the association between the indoor units 10a to 10i and the temperature sensors 14a to 14i can be changed in accordance with the measurement values of the temperature sensors 14a to 14i obtained in response to the operation of the indoor units 10a to 10i. As a result, even after an association is made between an indoor unit and a temperature sensor, the indoor unit can be associated with another temperature sensor by determination based on measurement values of temperature sensors.

(4-3)

In the facility device management system 101 according to this embodiment, the storage unit 110 further stores, as the installation location information of the temperature sensors 14a to 14i or the installation location information of the indoor units 10a to 10i, the installation location information of the indoor units 10a to 10i associated with the temperature sensors 14a to 14i or the installation location information of the temperature sensors 14a to 14i associated with the indoor units 10a to 10i.

In this facility device management system, when the installation location information of the indoor units 10a to 10i is manually input, the installation location information of the temperature sensors 14a to 14i associated with the indoor units 10a to 10i can be automatically input. When the installation location information of the temperature sensors 14a to 14i is manually input, the installation location information of the indoor units 10a to 10i associated with the temperature sensors 14a to 14i can be automatically input.

In the related art, an operator needs to manually input the installation location information of both an indoor unit and a temperature sensor and bears a large load. In this facility device management system, in contrast, the installation location information of one of an indoor unit and a temperature sensor is manually input, thereby enabling the installation location information of the other device to be automatically input. Thus, the load on the operator can be reduced.

(4-4)

In the facility device management system 101 according to this embodiment, the storage unit 110 further stores types of the indoor units 10a to 10i, the ventilation devices 11a to 11c, the outside air cooling devices 12a to 12c, and the outdoor unit 13 and the installation location information thereof, types of the temperature sensors 14a to 14i and the $CO_2$ sensors 15a to 15e and the installation location information thereof, and correspondence relationships between the types of the facility devices and the types of the sensor devices corresponding to control purposes such as temperature adjustment, $CO_2$ concentration adjustment, and outside air cooling. The facility device management system 101 associates facility devices, such as the indoor units 10a to 10i, the ventilation devices 11a to 11c, the outside air cooling devices 12a to 12c, and the outdoor unit 13, with the temperature sensors 14a to 14i and the $CO_2$ sensors 15a to

15*e* based on the types of the temperature sensors 14*a* to 14*i* and the $CO_2$ sensors 15*a* to 15*e* and the installation location information thereof, and the types of the indoor units 10*a* to 10*i*, the ventilation devices 11*a* to 11*c*, the outside air cooling devices 12*a* to 12*c*, the outdoor unit 13, and the like and the installation location information thereof.

In this facility device management system, the management apparatus 100 can associate a plurality of facility devices with sensor devices by acquiring the types and installation location information of the facility devices and the types and installation location information of the sensor devices.

(4-5)

In the facility device management system 101 according to this embodiment, the installation location information of the indoor units 10*a* to 10*i*, the ventilation devices 11*a* to 11*c*, the outside air cooling devices 12*a* to 12*c*, and the outdoor unit 13 includes a floor relationship or an adjacency relationship of the installation locations of the indoor units 10*a* to 10*i*, the ventilation devices 11*a* to 11*c*, the outside air cooling devices 12*a* to 12*c*, and the outdoor unit 13. The installation location information of the temperature sensors 14*a* to 14*i* and the $CO_2$ sensors 15*a* to 15*e* includes a floor relationship or an adjacency relationship of the installation locations of the temperature sensors 14*a* to 14*i* and the $CO_2$ sensors 15*a* to 15*e*.

In this facility device management system, the management apparatus 100 acquires information as to whether a plurality of facility devices and sensor devices are installed in the same space, and thus a facility device and a sensor device installed in the same space can be associated with each other.

(4-6)

In the facility device management system 101 according to this embodiment, the storage unit 110 further stores drawing information of a property 20 in which the indoor units 10*a* to 10*i*, the ventilation devices 11*a* to 11*c*, the outside air cooling devices 12*a* to 12*c*, the outdoor unit 13, the temperature sensors 14*a* to 14*i*, and the $CO_2$ sensors 15*a* to 15*e* are installed. The facility device management system 101 according to this embodiment associates facility devices and sensor devices with each other further based on the drawing information.

In this facility device management system, the management apparatus 100 acquires information as to whether a plurality of facility devices and sensor devices are installed in the same space, and thus a facility device and a sensor device installed in the same space can be associated with each other.

(4-7)

In the facility device management system 101 according to this embodiment, the management apparatus 100 further includes the program generation unit 140 that generates a cooperation control program based on an association.

In the facility device management system 101, a cooperation control program can be automatically generated. In the related art, an operator manually associates a facility device and a sensor device with each other. In the facility device management system 101, in contrast, a cooperation control program is automatically generated for an association between a facility device and a sensor device, which can reduce the load on the operator.

(4-8)

In the facility device management system 101 according to this embodiment, the management apparatus 100 includes the display unit 150 and displays a cooperation control program on the display unit 150.

In the facility device management system 101, an automatically generated cooperation control program can be checked using the management apparatus 100.

(4-9)

In the facility device management system 101 according to this embodiment, the management apparatus 100 further includes the switching unit 160 that switches between enabling and disabling a cooperation control program.

In the facility device management system 101, an unnecessary cooperation control program among automatically generated cooperation control programs can be set to be disabled. Accordingly, only a necessary cooperation control program can be used to manage an association for controlling the cooperation between a facility device and a sensor device.

(4-10)

In the facility device management system 101 according to this embodiment, the management apparatus 100 displays, on the display unit 150, a cooperation control program selected in terms of at least one of a plurality of conditions. The plurality of conditions include conditions for control purposes such as temperature adjustment, $CO_2$ concentration adjustment, and outside air cooling, installation locations of the indoor units 10*a* to 10*i*, the ventilation devices 11*a* to 11*c*, the outside air cooling devices 12*a* to 12*c*, the outdoor unit 13, the temperature sensors 14*a* to 14*i*, and the $CO_2$ sensors 15*a* to 15*e*, types of the indoor units 10*a* to 10*i*, the ventilation devices 11*a* to 11*c*, the outside air cooling devices 12*a* to 12*c*, and the outdoor unit 13, types of the temperature sensors 14*a* to 14*i* and the $CO_2$ sensors 15*a* to 15*e*, and enabling or disabling of cooperation control programs.

In the facility device management system 101, a cooperation control program to be displayed on the display unit 150 of the management apparatus 100 can be selected. Accordingly, a cooperation control program desired by a user can be displayed on the display unit.

(5) Modifications (5-1) Modification 1A

In the facility device management system 101 in this embodiment, the installation locations of the indoor units 10*a* to 10*i* are manually input by the contractor and stored in the storage unit 110. In an alternative system, the installation locations of the temperature sensors 14*a* to 14*i* may be manually input by the contractor and stored in the storage unit 110.

In a case where the installation locations of the temperature sensors 14*a* to 14*i* are manually input by the contractor, the storage unit 110 stores the installation location information of the temperature sensors 14*a* to 14*i* associated with the indoor units 10*a* to 10*i*, as the installation location information of the indoor units 10*a* to 10*i*.

(5-2) Modification 1B

In the facility device management system 101 in this embodiment, the storage unit 110 does not store drawing information of the building 20. However, the storage unit 110 may further store drawing information of the building 20 in which the facility devices and the sensor devices are installed. The management apparatus 100 acquires information as to whether a plurality of facility devices and sensor devices are installed in the same space, and thus the association B can be made between a facility device and a sensor device installed in the same space.

(5-3) Modification 1C

In this embodiment, the management apparatus 100 of the facility device management system 101 includes the switching unit 160. However, the management apparatus 100 of the facility device management system 101 may be configured not to include the switching unit 160.

(5-4) Modification 1D

In the facility device management system 101 in this embodiment, temperature sensors and $CO_2$ sensors are exemplified as sensor devices. However, other sensors, for example, humidity sensors, dust detection sensors, and odor sensors may be used.

(5-5) Modification 1E

In this embodiment, drawings depicting indoor units having ceiling-embedded inlet ports and outlet ports are used. However, the indoor units are not limited to this type. For example, the indoor units may be of a type in which an indoor unit main body having an inlet port and a heat exchanger is connected to a plurality of air supply port unit each having an air supply port via ducts. In this case, it is preferable that each of the air supply port units installed on the ceiling of the respective rooms has a receiving unit that communicates with a sensor device.

(5-6) Modification 1F

In this embodiment, the facility device management system 101 includes the management apparatus 100 separate from the facility devices. However, any one of a plurality of facility devices may include a management apparatus. For example, a facility device may include the storage unit 110, the change unit 130, the program generation unit 140, and the switching unit 160 mounted in the management apparatus 100.

(5-7) Modification 1G

While this embodiment describes a case where the management apparatus 100 associates the indoor units 10a to 10i and the temperature sensors 14a to 14i with each other and controls the cooperation between them, it is not limited thereto. The indoor units 10a to 10i and the temperature sensors 14a to 14i may be associated with each other, and the measurement value of the temperature sensor corresponding to each indoor unit may be analyzed. Analysis of whether the set temperature of an indoor unit is satisfied based on the measurement value of the corresponding temperature sensor leads to a discovery of a malfunction of the device or a failure in installation such as short circuit.

Further, analysis may be performed for each room to check the measurement value of the corresponding temperature sensor. The room temperature distribution, fluctuations, and the like in each room can be analyzed to determine whether the room temperature of the room satisfies criteria of comfort.

(5-8) Modification 1H

While this embodiment describes a case where the management apparatus 100 associates the ventilation devices 11a to 11c and the $CO_2$ sensors 15a to 15e with each other and controls the cooperation between them, it is not limited thereto. Analysis may be performed for each ventilation device to check the measurement value of the corresponding $CO_2$ sensor. Analysis of whether the $CO_2$ concentration is sufficiently lowered when a ventilation device is in operation leads to a discovery of a malfunction of the device, clogging of the filter, a failure in installation, or the like.

Further, analysis may be performed for each room to check the measurement value of the corresponding $CO_2$ sensor. The $CO_2$ concentration distribution, fluctuations, and the like in each room can be analyzed to determine whether the $CO_2$ concentration in the room satisfies the requirements of the Building Management Act (a law concerning securing of a sanitary environment in a building).

(5-9) Modification 1I

While an embodiment of the present disclosure has been described, it will be understood that forms and details can be changed in various ways without departing from the spirit and scope of the present disclosure as recited in the claims.

The invention claimed is:

1. A facility device management system comprising:
a plurality of facility devices each configured to perform air conditioning, the plurality of facility devices including a first facility device having identification information;
a management apparatus configured to communicate with the facility devices via a network, the management apparatus including a processor and a storage; and
a sensor device including a wireless communication unit, the first facility device being configured to
receive data from the sensor device via wireless communication, and
transmit the data, together with the identification information, to the management apparatus, and
the management apparatus being configured to
associate the first facility device and the sensor device with each other based on information received from the first facility device, and
store an association between the first facility device and the data of the sensor device in the storage.

2. The facility device management system according to claim 1, wherein
the data includes a measurement value, and
the management apparatus being further configured to
transmit a predetermined control command to the facility devices, and
change the association between the first facility device and the sensor device in accordance with a degree of influence on the measurement value of the sensor device caused by the control command.

3. The facility device management system according to claim 2, wherein
the storage further stores installation location information of the first facility device associated with the sensor device or installation location information of the sensor device associated with the first facility device, as the installation location information of the sensor device or the installation location information of the first facility device, respectively.

4. The facility device management system according to claim 2, wherein
the storage further stores
a type of the facility devices and installation location information thereof,
a type of the sensor device and installation location information thereof, and
a correspondence relationship between the type of the facility devices and the type of the sensor device corresponding to a control purpose, and
the facility device management system associates the facility devices and the sensor device with each other based on
the type of the sensor device and the installation location information thereof and
the type of the facility devices and the installation location information thereof.

5. The facility device management system according to claim 2, wherein
the management apparatus is further configured to generate a cooperation control program based on the association.

6. The facility device management system according to claim 1, wherein
the storage further stores installation location information of the first facility device associated with the sensor device or installation location information of the sensor device associated with the first facility device, as the installation location information of the sensor device or the installation location information of the first facility device, respectively.

7. The facility device management system according to claim 6, wherein
the storage further stores
a type of the facility devices and installation location information thereof,
a type of the sensor device and installation location information thereof, and
a correspondence relationship between the type of the facility devices and the type of the sensor device corresponding to a control purpose, and
the facility device management system associates the facility devices and the sensor device with each other based on
the type of the sensor device and the installation location information thereof and
the type of the facility devices and the installation location information thereof.

8. The facility device management system according to claim 6, wherein
the management apparatus is further configured to generate a cooperation control program based on the association.

9. The facility device management system according to claim 1, wherein
the storage further stores
a type of the facility devices and installation location information thereof,
a type of the sensor device and installation location information thereof, and
a correspondence relationship between the type of the facility devices and the type of the sensor device corresponding to a control purpose, and
the facility device management system associates the facility devices and the sensor device with each other based on
the type of the sensor device and the installation location information thereof and
the type of the facility devices and the installation location information thereof.

10. The facility device management system according to claim 9, wherein
the installation location information of the facility devices includes a floor relationship or an adjacency relationship of installation locations of the facility devices, and
the installation location information of the sensor device includes a floor relationship or an adjacency relationship of an installation location of the sensor device.

11. The facility device management system according to claim 10, wherein
the storage further stores drawing information of a property in which the facility devices and the sensor device are installed, and
the facility device management system associates the facility devices and the sensor device with each other further based on the drawing information.

12. The facility device management system according to claim 9, wherein
the storage further stores drawing information of a property in which the facility devices and the sensor device are installed, and
the facility device management system associates the facility devices and the sensor device with each other further based on the drawing information.

13. The facility device management system according to claim 9, wherein
the management apparatus is further configured to generate a cooperation control program based on the association.

14. The facility device management system according to claim 1, wherein
the management apparatus is further configured to generate a cooperation control program based on the association.

15. The facility device management system according to claim 14, wherein
the management apparatus includes a display unit, and the management apparatus is configured to display the cooperation control program on the display unit.

16. The facility device management system according to claim 15, wherein
the management apparatus if further configured to switch between enabling and disabling the cooperation control program.

17. The facility device management system according to claim 15, wherein
the management apparatus is configured to display, on the display unit,
a cooperation control program selected in terms of at least one of a condition for the control purpose,
a condition for installation locations of the facility devices and the sensor device,
a condition for a type of the facility devices, a condition for a type of the sensor device, or
a condition for enabling or disabling the cooperation control program.

18. The facility device management system according to claim 14, wherein
the management apparatus is further configured to switch between enabling and disabling the cooperation control program.

* * * * *